(12) United States Patent
Carrano et al.

(10) Patent No.: US 7,245,742 B2
(45) Date of Patent: Jul. 17, 2007

(54) VIDEO SURVEILLANCE WITH SPECKLE IMAGING

(75) Inventors: Carmen J. Carrano, Livermore, CA (US); James M. Brase, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 825 days.

(21) Appl. No.: 10/610,152

(22) Filed: Jun. 30, 2003

(65) Prior Publication Data

US 2004/0005098 A1  Jan. 8, 2004

Related U.S. Application Data

(60) Provisional application No. 60/393,228, filed on Jul. 1, 2002.

(51) Int. Cl.
*G06K 9/00* (2006.01)
*G06K 9/32* (2006.01)
*G06K 9/40* (2006.01)
*G01J 1/20* (2006.01)

(52) U.S. Cl. .................. 382/103; 382/275; 382/299; 382/255; 250/201.9

(58) Field of Classification Search ................ 382/255, 382/275, 103, 106, 109, 299; 250/208.1, 250/201
See application file for complete search history.

(56) References Cited

U.S. PATENT DOCUMENTS

| | | | |
|---|---|---|---|
| 4,913,549 A | 4/1990 | Fujita et al. | |
| 5,093,563 A | 3/1992 | Small et al. | |
| 5,159,489 A | 10/1992 | Massie et al. | |
| 5,208,654 A | 5/1993 | Shao et al. | |
| 5,384,455 A | 1/1995 | Paxman | |
| 5,448,053 A | 9/1995 | Rhoads | |
| 6,084,227 A | 7/2000 | Rhoads | |
| 6,184,981 B1 | 2/2001 | Hasson et al. | |
| 6,240,219 B1 | 5/2001 | Gregory | |
| 6,288,974 B1 | 9/2001 | Nelson | |
| 6,429,415 B1 | 8/2002 | Rhoads | |
| 2002/0141653 A1 | 10/2002 | Estevez et al. | |
| 2002/0165837 A1 | 11/2002 | Zhang et al. | |
| 2002/0191866 A1 | 12/2002 | Tanabe | |

OTHER PUBLICATIONS

Lawrence, T. W., et al., "Speckle Imaging of Satellites at the U.S. Air Force Maui Optical Station," Applied Optics, vol. 31, No. 29, pp. 6307-6321, Oct. 10, 1992.
Von der Luhe, O., "Speckle Imaging of Solar Small Scale Structure I. Methods," Astronomy and Astrophysics, 268, pp. 374-390 (1993).
Lohmann, A., et al., "Triple Correlations," Proceedings of the IEEE, vol. 72, No. 7, pp. 889-901 Jul. 1984.

*Primary Examiner*—Matthew C. Bella
*Assistant Examiner*—Wes Tucker
(74) *Attorney, Agent, or Firm*—Eddie E. Scott; John H. Lee

(57) ABSTRACT

A surveillance system looks through the atmosphere along a horizontal or slant path. Turbulence along the path causes blurring. The blurring is corrected by speckle processing short exposure images recorded with a camera. The exposures are short enough to effectively freeze the atmospheric turbulence. Speckle processing is used to recover a better quality image of the scene.

13 Claims, 4 Drawing Sheets

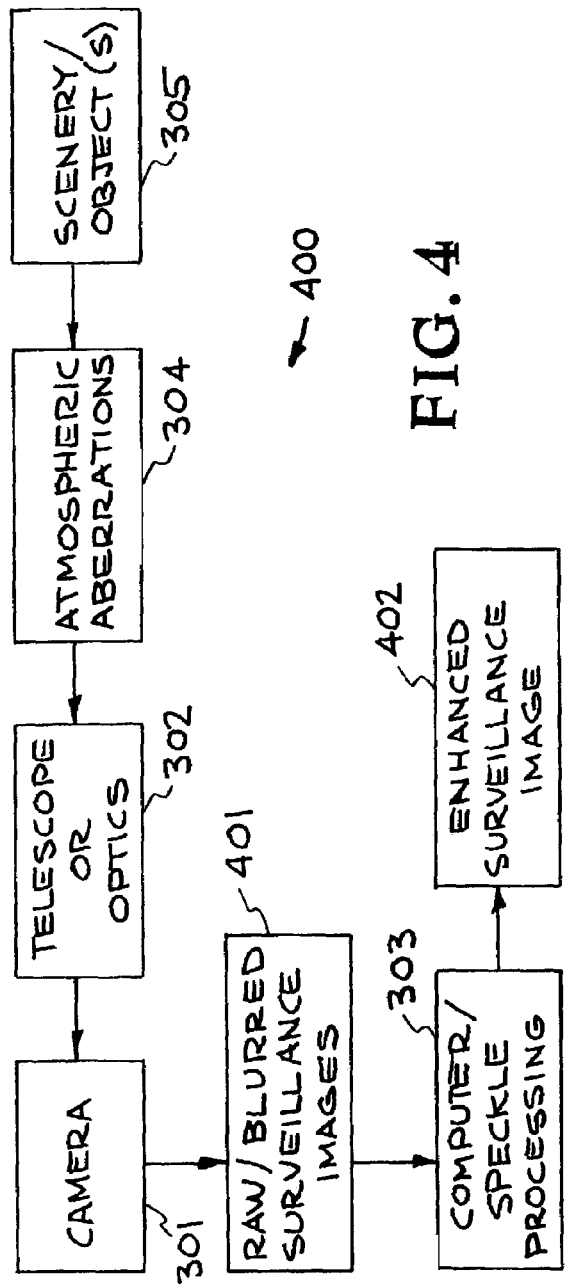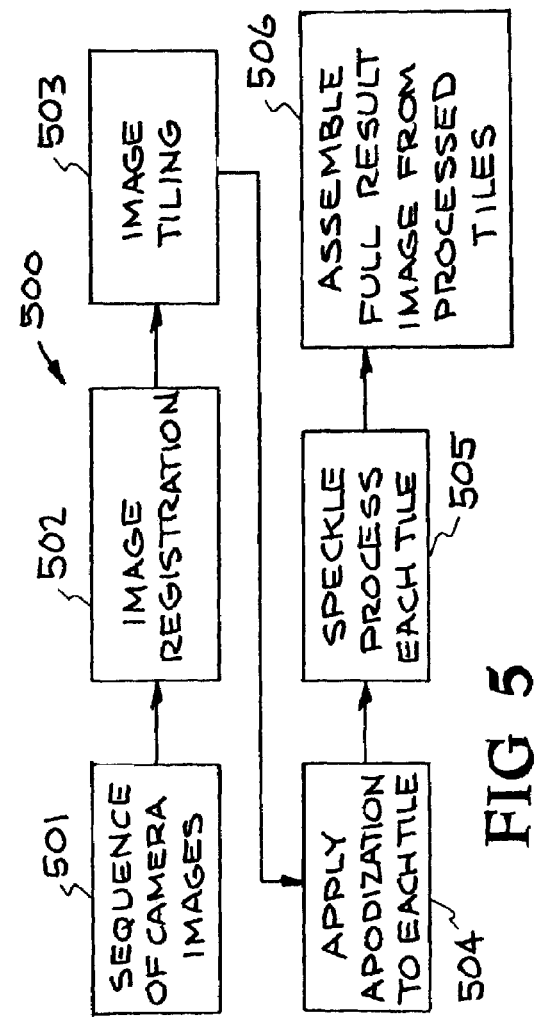

FIG. 6

VIDEO SURVEILLANCE WITH SPECKLE IMAGING

CROSS-REFERENCE TO RELATED APPLICATIONS

This application claims the benefit of U.S. Provisional Patent Application No. 60/393,228 filed Jul. 1, 2002 titled "Enhanced Video Surveillance with Speckle Imaging." U.S. Provisional Patent Application No. 60/393,228 filed Jul. 1, 2002, titled "Enhanced Video Surveillance with Speckle Imaging," is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to surveillance and more particularly to surveillance with speckle imaging.

2. State of Technology

U.S. Pat. No. 6,288,974 issued Sep. 11, 2001 for a system and method for enhancing detection of objects through an obscuring medium by Robert S. Nelson and assigned to The United States of America as represented by the Secretary of the Navy provides the following state of the art information, "The detection of moving objects through an obscuring media can be a difficult task, even for advanced electronic imaging systems. Image acquisition by electronic systems is most readily accomplished when the moving object is located in a transparent medium. However, even transparent media can contain sources of signal aberrations that make image acquisition difficult. Obscuring media are media that impede image acquisition due to phenomena such as absorption, scattering, aberration, or boundary effects. For purposes of detecting and tracking moving objects, electronic imaging systems are generally preferred over other means of image acquisition for several reasons. Electronic imaging systems are not only able to generate images, but also accurately determine one or more of the position, range, bearing and speed of a moving object. Thus electronic systems can track as well as identify the moving object. Another advantage of electronic imaging systems is the ability of electronic systems to digitize the image signal of the object and perform computational processing tasks such as contrast enhancement, smoothing and blending of adjacent image pixels, deconvolution, and subtraction of one image from another. Electronic imaging systems may not effectively image or track a moving object if the object is moving in an obscuring medium. Certain media obscure the object, that is, make detection difficult. . . . The atmosphere and relevant boundaries may each be obscuring as well. For electromagnetic radiation that is not highly absorbed or scattered by the atmosphere, obscuration may derive from turbulence."

U.S. patent application Ser. No. 2002/0191866 for an image signal processing system by Kazuhiro Tanabe published Dec. 19, 2002 provides the following state of the art information, "The recent video cameras have an electrically zooming-in (or magnifying) function incorporated. That is, a partial image is cut from the image produced from an image pickup device (image sensor) such as CCD, and the data of the partial image is processed by using a memory to change the time base so that the image can be expanded. The image data decreased in the density of its pixels by the extension of the time base is subjected to an electrical interpolation processing in order to compensate for the data, and the interpolation processed data is output at a predetermined data rate."

U.S. patent application Ser. No. 2002/0141653 for image compression by Leonardo Estevez and Karen Oehler published Oct. 3, 2002 provides the following state of the art information, "Recently, Digital Still Cameras (DSCs) have become a very popular consumer appliance appealing to a wide variety of users ranging from photo hobbyists, web developers, real estate agents, insurance adjusters, photo journalists to everyday photography enthusiasts. Recent advances in large resolution CCD arrays coupled with the availability of low-power digital signal processors (DSPs) has led to the development of DSCs that come quite close to the resolution and quality offered by traditional film cameras. These DSCs offer several additional advantages compared to traditional film cameras in terms of data storage, manipulation, and transmission. The digital representation of captured images enables the user to easily incorporate the images into any type of electronic media and transmit them over any type of network. The ability to instantly view and selectively store captured images provides the flexibility to minimize film waste and instantly determine if the image needs to be captured again. With its digital representation the image can be corrected, altered, or modified after its capture."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The present invention provides a surveillance system for improving the quality of surveillance images received over horizontal or slant paths having atmospheric aberrations. The system comprises camera means for capturing the surveillance images, means for focusing the surveillance images, means for producing short exposures of the surveillance images, and means for speckle processing the short exposures and improving the quality of the surveillance images. The scope of the invention is not intended to be limited to the particular forms disclosed and the invention covers all modifications, equivalents, and alternatives falling within the spirit and scope of the invention as defined by the claims.

As the nature of military and intelligence operations changes to focus more on counter terrorist and homeland security issues, the requirements for surveillance and related imaging capabilities are increasing. For example, a capability to identify individual people or vehicles from ranges of a few to ten's of kilometers could be critical in these new types of operations. A fundamental problem in providing imaging performance at this level is blurring caused by atmospheric turbulence.

For many surveillance applications the imaging system must look through the atmosphere along a horizontal or slant path. Turbulence along the path causes variations in the index of refraction that lead to phase errors in the propagating field. When the optical beam is brought to focus the resulting image is blurred by the atmospheric phase errors. For a typical near-ground horizontal or slant path the blurring can be quite severe. The resolution of an eight-inch telescope will be reduced by as much as a factor of 20 along a horizontal path in average atmospheric turbulence.

The present invention provides imaging through the atmosphere that is not limited by the atmosphere. An imaging system corrects for atmospheric blurring by recording short exposure images with a camera through an optics system. The exposures are short enough to effectively freeze the atmospheric turbulence enabling the use of speckle processing techniques to recover a diffraction limited image of the scene.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 4 shows the video surveillance system in greater detail.

FIG. 5 provides additional details of the surveillance system processing steps.

FIG. 6 provides an example of the improvement in an image that can be produced by the system of the present invention.

DETAILED DESCRIPTION OF THE INVENTION

Figure 1:
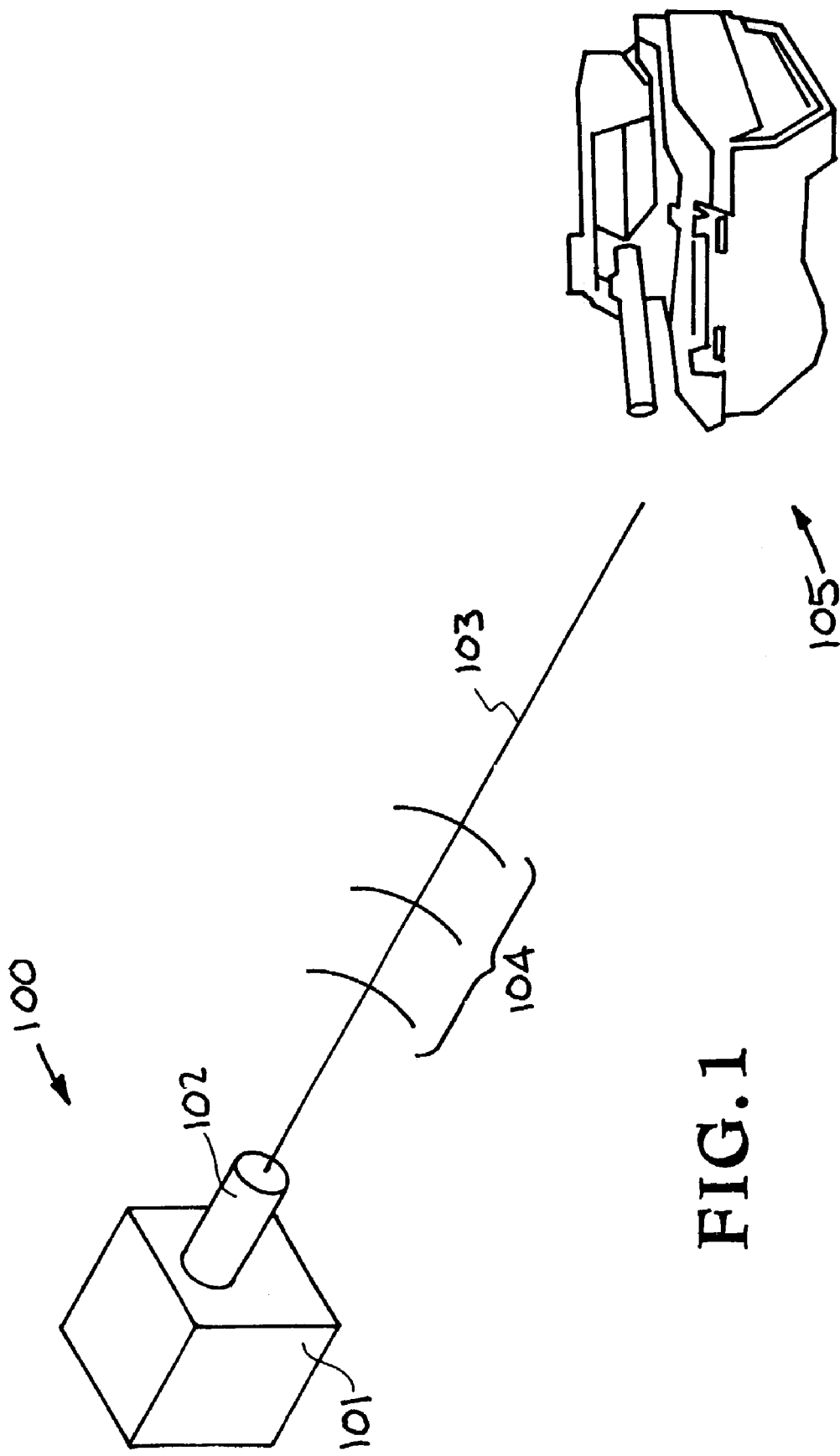
FIG. 1 illustrates a system constructed in accordance with the present invention.

Referring now to the drawings, to the following detailed description, and to incorporated materials; detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

A system constructed in accordance with the present invention is illustrated in FIG. 1. The system is designated generally by the reference numeral 100. The system 100 is a surveillance system that includes a surveillance camera 101. An optics system 102 is connected to the surveillance camera 101. The surveillance camera and optics path 103 is directed generally horizontal or at a slant angle. The path 103 from the object or scenery 105 passes through atmospheric aberrations 104 before reaching the optics system 102 and then to the surveillance camera 101, which captures the surveillance images 105.

Surveillance camera systems are generally mounted so that the view "looks" across the area and the view is either parallel to the ground or at a slant angle either up or down relative to the horizontal. In some instances this slant angle may be a steep angle, for example in the situation where the surveillance camera and optics system in carried by an aerial vehicle and the surveillance camera/optics system are looking toward the ground. The surveillance system 100 can be applied to an extensive number of imaging geometries. For example, The surveillance system 100 can be applied to a ground to ground situation, a ground to hillside situation, a mountaintop to ground situation, a building to ground situation, a building to building situation, an airborne to ground situation, various other combinations, and to other surveillance situations.

The surveillance system 100 illustrated in FIG. 1 improves resolution and/or contrast in the surveillance images 105 received over the horizontal or slant path 103 having atmospheric aberrations 104. The surveillance system 100 comprises a camera means 101 for capturing the surveillance images 105, optics means 102 for focusing and/or enlarging the surveillance images, means operatively connected to the camera means for producing short exposures of the surveillance images, and means for speckle processing the short exposures and improving resolution and/or contrast in the surveillance images 105.

As the nature of military and intelligence operations changes to focus more on counter terrorist and homeland security issues, the requirements for surveillance and related imaging capabilities are increasing. The capability to identify individual people or vehicles from ranges of a few to ten's of kilometers can be critical in these new types of operations. A fundamental problem in providing imaging performance at this level is blurring caused by the atmospheric turbulence or atmospheric aberrations.

The surveillance system 100 illustrated in FIG. 1 looks through the atmosphere along the horizontal or slant path 103. Turbulence along the path causes variations in the index of refraction that lead to phase errors in the propagating field. When the surveillance imagery 105 is brought to focus the resulting image is blurred by the atmospheric phase errors, atmospheric aberrations 104. For a typical near-ground horizontal path the blurring can be quite severe. The resolution of an eight-inch telescope will be reduced by as much as a factor of 20 along a horizontal path in average atmospheric turbulence.

In a short exposure image looking through the atmosphere, the atmospheric phase errors are frozen in time. The image is a speckle pattern which contains spatial frequencies all the way out to the diffraction limit. No information is lost, it is just scrambled in phase. If the short exposure images are averaged, the resulting long exposure image is blurred. The high spatial frequencies are lost in the averaging process.

By recording a series of short exposure images it is possible to use image processing algorithms to recover the correct image phases and produce a high-resolution image. The algorithm averages the bispectrum of the image. This average has the property the random atmospheric phase errors average out leaving the bispectrum of the object itself. The image phase can be reconstructed using a three-point spatial integration algorithm.

The purpose of speckle imaging is to obtain an estimate of the true object from a time series of short exposure images of the object. This is done by estimating both the Fourier magnitude and phase of the object, independently, and then inverse transforming.

Figure 2:
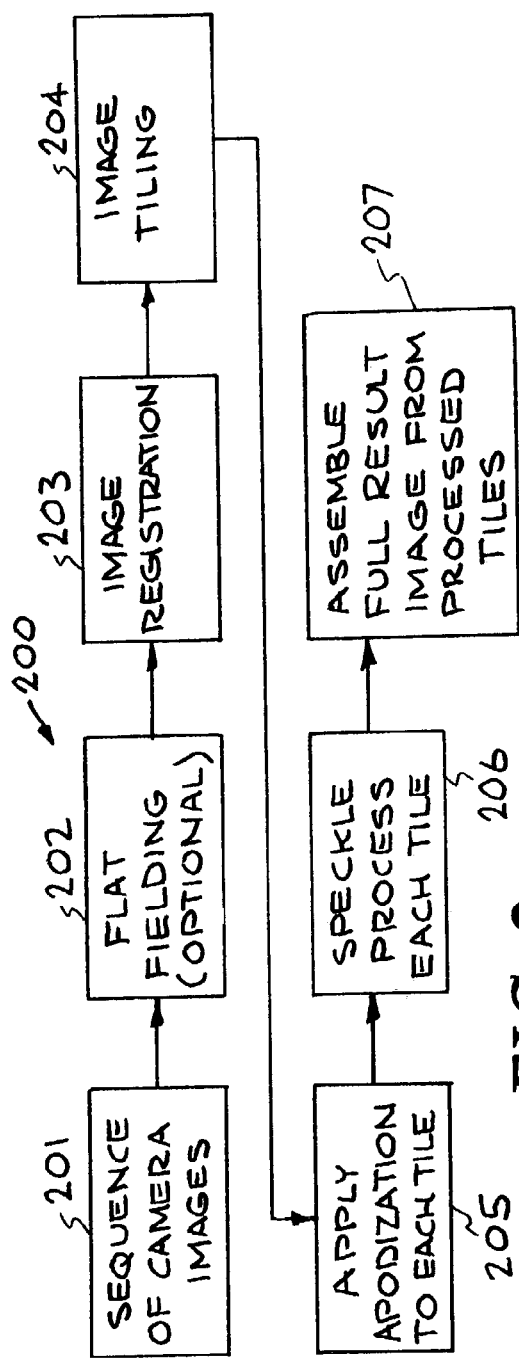
FIG. 2 summarizes the surveillance system processing steps.

The surveillance system processing steps are summarized in FIG. 2, and are designated generally by the reference numeral 200. Block 201 represents the sequence of raw images. Block 202 represents flatfielding (this step is optional). Block 203 represents frame-by-frame registration. Block 204 represents image tiling. Block 205 represents apply apodization to each tile. Block 206 represents speckle process each tile. Block 207 represents assemble full results image from processed tiles.

The image is modeled with the following convolutions:

$$i_n(x) = \tau_n(x) * o(x) \qquad (1)$$

where $i_n(x)$ is the nth speckle image in an ensemble, $o(x)$ is the object to be recovered, and $\tau_n(x)$ is the combined atmosphere-telescope point-spread function. By a Fourier transform of this relationship, the convolution becomes a multiplication. The powerspectrum is then averaged over each frame and solved for the Fourier magnitude.

$$|o(u)|_{est} = \left[ \frac{\langle |I_n(u)|^2 \rangle_n}{\langle |\tau_n u|^2 \rangle_n} \right]^{1/2} \qquad (2)$$

Because horizontal path imagery is involved, there is unlikely to be a point reference for generating $\langle |\tau_n(X)|^2 \rangle$. Instead, a model is used for this, where $r_o$, the atmospheric coherence length, is chosen and plugged into the Labeyrie-Korff transfer function. Since $r_o$ is not known, iteration is used to find the best value. Trying values of $r_o$ between 1 cm and 4 cm in increments of 0.5 cm will nearly always yield one or more acceptable images.

For the phase estimate, the complex bispectrum is used. The bispectrum is defined in spatial frequency space as:

$$I_B(u, v) = I_n(u) I_n(v) I_n(-u-v), \qquad (3)$$

where u and v are spatial frequency vectors. It is shown that the Fourier phase of the object is recursively related to the phase of the average complex bispectrum according to a three-point integration:

$$\arg|O(u+v)| = \arg|O(u)| + \arg|O(v)| - \arg\langle I_{B,n}(u,v)\rangle_n \qquad (4)$$

Starting with aribtrary boundary conditions at the origin and the first two frequency points on axis in the frequency domain, it is possible to recover the object phase through recursive application of Equation 4. In fact, since there are many combinations of u and v that give the same u+v, it is possible to average over large amounts of non-redundant information. The implementation of this recursion allows the selection of how much averaging is performed. Values between 4 and 8 averaged data points give nice results.

After the Fourier magnitude and phase are estimated, they are simply combined and inverse transformed.

In the first step, if needed, is to perform flat fielding of the image sequence. This is needed if there is any dust on the camera optics system that causes noticeable spots in the image. This procedure consists of dividing each frame in the sequence by a flat-field image. A flat-field image can be generated by acquiring one or more frames of a flat field, such as the sky and averaging them together. The image should then be normalized so the average value is one.

In the second step, a global frame-by-frame registration is performed. In the data acquisition, both telescope shaking and atmospheric tip/tilt contribute to x and y shifting of the frames. Shifts are calculated using the standard Fourier correlation methods on high-passed versions of the data. The first frame is taken as the alignment reference, assuming it is a representative frame. It is also possible to align to the frame average just as easily. The shifting is typically less than ten percent of the full image size, which means that the outer pixels of the processed image will be unreliable. If the surveillance system is suitably stabilized, this processing step may or may not be needed.

An intrinsic feature of horizontal-path imaging through volume turbulence is that the isoplanatic angles will typically be much smaller than the scene you need to image. As in solar astronomy, we have found that breaking up the image sequence into small regions or tiles can improve the reconstructed image quality substantially. In this processing step, the sequence of large images is split up into a number of smaller overlapped image sequences or image tiles sequences. The amount of overlapping used is 50%. If the size of the tile used is 256×256 pixels, for a 1280×1024 image, it means processing 9×7 or 63 tiles. We have found that the choice of tile size is directly related to the isoplanatic patch size, but can be many times larger to obtain good quality results.

Unlike astronomical scenery, where the object of interest is compact and the data essentially falls away to zero outside the object, horizontal-path terrestrial scenery fill the image. This means that prior to the Fourier transform step of speckle processing, windowing or edge apodization will be needed in order to avoid ringing at the edges. In order to preserve as much of the scene as possible, the choice of window leaves the center of the scene untouched and tapers the edges of the scene. It has been found that a Hanning window taper works well for most cases. The amount of apodization that should be used, which determines the steepness or slope of the window taper, depends on the atmospheric conditions. If the blurring caused by the atmosphere covers N pixels, then the window taper needs to span greater than N pixels. If the taper is too sharp, the speckle processing will confuse the window with the data and put artifacts in the result. It has been found apodization between 50% and 80% works quite well.

After each tile is processed, the full image is assembled. Since the tiles overlap by 50%, a standard square-shaped Hanning window is applied to each reconstructed tile and added up in the proper locations. Hanning windows have the nice feature that when shifted by half a cycle and summed, they add to one. This means there are no artifacts from the overlapping and adding of the tiles.

Figure 3:
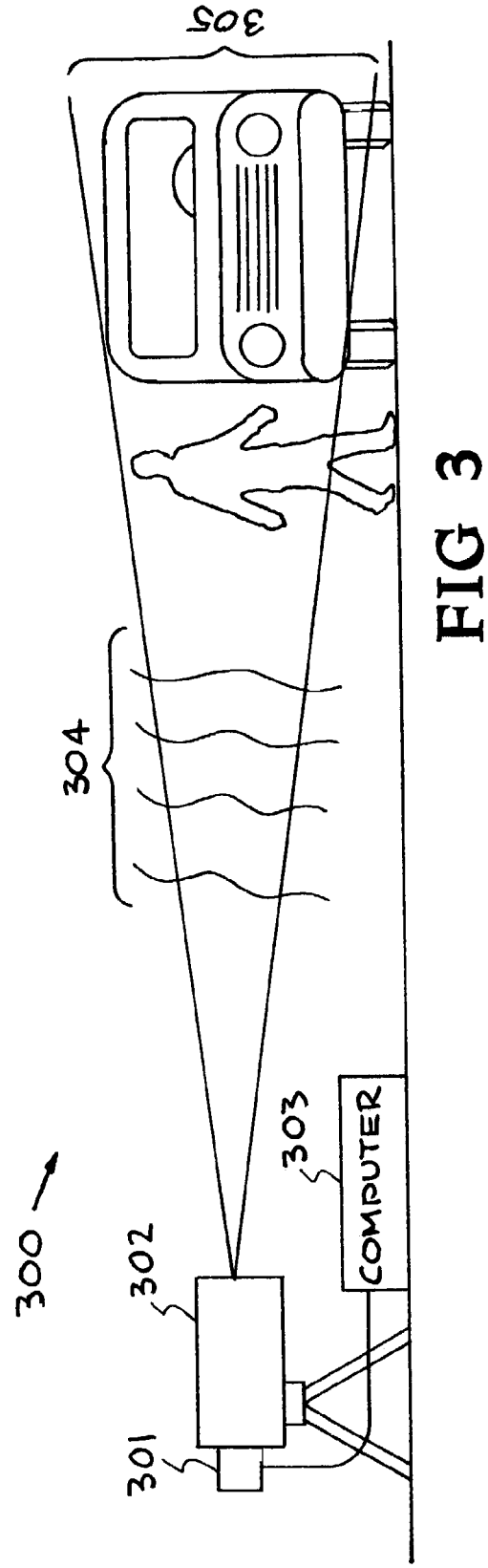
FIG. 3 illustrates a system utilizing a video camera and a telescope.

Referring now to FIG. 3, a system utilizing a video camera and a telescope is illustrated. The system is designated generally by the reference numeral 300. The surveillance system 300 comprises three primary parts: telescope 302, camera 301, and computer 303. Surveillance camera systems are generally mounted so that the view "looks" across the area and the view is generally parallel to the ground. In some instances the surveillance camera is at a slant angle either up or down relative to the horizontal. The surveillance camera and telescope path is directed generally horizontal or at a slant angle. The telescope path passes through atmospheric aberrations 304 in capturing the surveillance images 305.

The telescope 302 or optic in front of the camera 301, needs to have an aperture sufficiently large enough to suffer from atmospheric blurring in the wavelength band of interest, that is, the aperture diameter must be a few times larger than the atmospheric coherence length. Typically it will need to be at least several cm in diameter for imaging at 0.5 um. The camera 301 needs to have pixel sizes that are sufficiently small enough to see the atmospheric blurring. The camera 301 must also be capable of exposures short enough to provide sufficient atmospheric freezing over the imaging path of interest (order milliseconds to 10's of ms). The camera 301 must then send the surveillance imagery via an appropriate data transfer method to the computer 303 for speckle image, processing to produce the enhanced image.

In specific embodiments, the camera 301 can be a CCD camera, the CCD camera can be intensified, an image intensifier can be inserted between the telescope 302 and the camera 301. The range of wavelengths used by the camera 301 can be visible, IR, thermal, etc. The computer 303 can provide real or near-real time speckle processing.

In a short exposure image looking through the atmosphere, the atmospheric phase errors are frozen in time. The image is a speckle pattern which contains spatial frequencies all the way out to the diffraction limit. No information is lost, it is just scrambled in phase. If the short exposure images are averaged, the resulting long exposure image is blurred. The high spatial frequencies are lost in the averaging process.

By recording a series of short exposure images it is possible to use image processing algorithms to recover the correct image phases and produce a high-resolution image. The algorithm averages the bispectrum of the image. This average has the property the random atmospheric phase errors average out leaving the bispectrum of the object itself. The image phase can be reconstructed using a three-point spatial integration algorithm.

The purpose of speckle imaging is to obtain an estimate of the true object from a time series of short exposure images of the object. This is done by estimating both the Fourier magnitude and phase of the object, independently, and then inverse transforming.

Referring now to FIG. 4, the video surveillance system 300 illustrated in FIG. 3 is described in greater detail. The surveillance system 300 looks through the atmosphere along a horizontal or slant path. Turbulence along the path causes variations in the index of refraction that lead to phase errors in the propagating field. When the surveillance imagery, scenery/objects 105, is brought to focus through telescope and/or optics 302, the resulting image is blurred by the atmospheric phase errors, atmospheric aberrations 304. The camera 301 sends the raw/blurred surveillance images 401 via an appropriate data transfer system to the computer 303 for speckle image processing 303 to produce the enhanced surveillance images 402. By recording a series of short exposure images it is possible to use image processing algorithms to recover the correct image phases and produce a high-resolution image. In a short exposure image looking through the atmosphere, the atmospheric phase errors are frozen in time. The image is a speckle pattern which contains spatial frequencies all the way out to the diffraction limit. No information is lost, it is just scrambled in phase. If the short exposure images are averaged, the resulting long exposure image is blurred. The high spatial frequencies are lost in the averaging process.

Additional details of the surveillance system processing steps are summarized in FIG. 5. These processing steps are designated generally by the reference numeral 500. Block 501 represents the sequence of camera images. Block 502 represents image registration. Block 503 represents image tiling. Block 504 represents apply apodization to each tile. Block 505 represents speckle process each tile. Block 506 represents assemble full results image from processed tiles.

The processing steps 500 provide a system for imaging through the atmosphere that is not limited by the atmosphere. The processing steps 500 correct for atmospheric blurring by recording short exposure images with a camera through an optics system. The exposures are short enough to effectively freeze the atmospheric turbulence enabling the use of bispectral speckle processing to recover a diffraction limited image of the scene.

Referring now to FIG. 6, an example shows the improvement in an image that can be provided by the system of the present invention. The left image is the unprocessed image. The right image is the speckle-tile processed image with 256×256 pixel sized tiles using 100 frames of short exposure imagery. This data was provided from 3.3 km range over a low slant path about 3 degrees incline. The right speckle-tile processed image is of better quality.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A surveillance apparatus for providing surveillance of people or a vehicle in a ground to ground situation, a ground to hillside situation, a mountaintop to ground situation, a building to ground situation, a building to building situation, an airborne to ground situation, or combinations of the situations and improving resolution or contrast or resolution and contrast in surveillance images received over a horizontal path or a slant path having atmospheric aberrations, comprising:

a surveillance camera positioned to have a camera view across the ground situation, the ground to hillside situation, the mountaintop to ground situation, the building to ground situation, the building to building situation, the airborne to ground situation, or combinations of the situations wherein the camera view is either parallel to the ground or at a slant angle to the ground either up or down relative to the horizontal for capturing the surveillance images received over the horizontal path or the slant path having atmospheric aberrations, optics for focusing or enlarging or focusing and enlarging the surveillance images, said optics operatively connected to said camera and directed along the horizontal path or slant path, and a computer system operatively connected to said camera for producing short exposures of the surveillance images and for speckle processing said short exposures and improving resolution or contrast or resolution and contrast in the surveillance images received over the horizontal path or the slant path having atmospheric aberrations.

2. The surveillance apparatus of claim 1, wherein said computer system utilizes speckle processing of small subregions of said short exposures and tiles said subregions back together.

3. The surveillance apparatus of claim 1, wherein said computer system effectively freezes said atmospheric aberrations and utilizes said speckle processing to recover a diffraction limited image of said surveillance images.

4. The surveillance apparatus of claim 1, wherein said computer system provides a sequence of said surveillance images, provides image registration, provides image tiling producing tiles, applies apodization to each said tile, speckle processes each said tile, and assembles said surveillance images by processing said tiles.

5. The surveillance apparatus of claim 1, wherein said camera is a digital camera.

6. The surveillance apparatus of claim 1, wherein said camera is a video camera.

7. The surveillance apparatus of claim 1, wherein said camera is a CCD camera.

8. The surveillance apparatus of claim 1, wherein said optics is a telescope.

9. A surveillance apparatus for providing surveillance of people or a vehicle in a ground to ground situation, a ground to hillside situation, a mountaintop to ground situation, a building to ground situation, a building to building situation, an airborne to ground situation, or combinations of the situations and correcting atmospheric blurring in a surveillance image recorded over a horizontal path or a slant path, comprising:

a surveillance camera for recording the surveillance image, said surveillance camera positioned to have a camera view across the ground situation, the ground to hillside situation, the mountaintop to ground situation, the building to ground situation, the building to building situation, the airborne to ground situation, or combinations of the situations wherein the camera view is either parallel to the ground or at a slant angle to the ground either up or down relative to the horizontal optics for focusing enlarging or focusing and enlarging the surveillance image, said optics operatively connected to said camera and directed along said horizontal path or the slant path, and a computer system operatively connected to said camera for producing short exposures of the surveillance image and for speckle processing said short exposures and correcting atmospheric blurring in the surveillance image.

10. The surveillance apparatus of claim 9, wherein said computer system obtains an estimate of the said surveillance image from a time series of short exposures of said surveillance image by estimating both the Fourier magnitude and phase of said surveillance image independently and inverse transforming said Fourier magnitude and phase.

11. A surveillance system for providing surveillance of people or a vehicle in a ground to ground situation, a ground to hillside situation, a mountaintop to ground situation, a building to ground situation, a building to building situation, an airborne to ground situation, or combinations of the situations and improving the quality of surveillance images received over a horizontal path or a slant path having atmospheric aberrations, comprising:

surveillance camera means positioned to have a camera view across the ground situation, the ground to hillside situation, the mountaintop to ground situation, the building to ground situation, the building to building situation, the airborne to ground situation, or combinations of the situations wherein the camera view is either parallel to the ground or at a slant angle to the ground either up or down relative to the horizontal for capturing said surveillance images, means for focusing said surveillance images, said means operatively connected to said camera means and positioned for focusing along the horizontal path or the slant path, means operatively connected to said camera means for producing short exposures of said surveillance images, and means for speckle processing said short exposures and improving the quality of the surveillance images received over the horizontal path or the slant path having atmospheric aberrations.

12. The surveillance system of claim 11, wherein said means for speckle processing said short exposures comprises means for speckle processing small subregions of said short exposures and tiling said subregions back together.

13. The surveillance system of claim 12, wherein said means for speckle processing said short exposures comprises means for effectively freezing said atmospheric aberrations, enabling said means for speckle processing to recover a diffraction limited image of said surveillance images.

* * * * *